Feb. 18, 1969 L. S. DZUNG 3,428,835
MAGNETOHYDRODYNAMIC MACHINE

Filed March 28, 1966 Sheet 1 of 2

INVENTOR
Lang Shuen Dzung

BY Pierce, Scheffler & Parker
ATTORNEYS

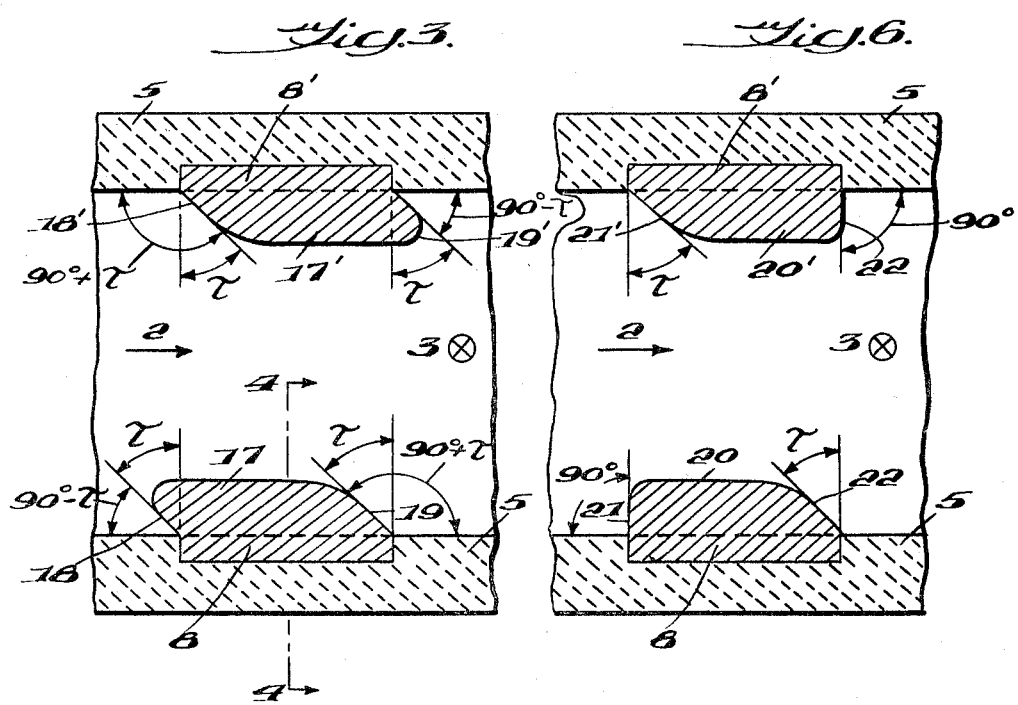
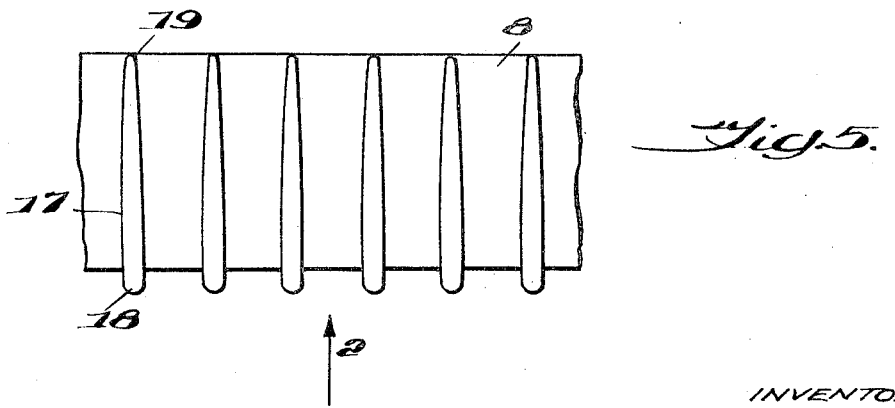

United States Patent Office 3,428,835
Patented Feb. 18, 1969

3,428,835
MAGNETOHYDRODYNAMIC MACHINE
Lang Shuen Dzung, Wettingen, Switzerland, assignor to Aktiengesellschaft Brown, Boveri & Cie, Baden, Switzerland, a joint-stock company
Filed Mar. 28, 1966, Ser. No. 537,809
Claims priority, application Switzerland, Apr. 27, 1965, 5,866/65
U.S. Cl. 310—11    9 Claims
Int. Cl. G21d 7/02; H02k 45/00

The present invention relates to a magnetohydrodynamic machine embracing a duct having ionized gas flowing through it in the longitudinal direction, means for producing a magnetic field extending perpendicularly to the direction in which the gas flows, and a plurality of electrodes arranged in pairs parallel to the magnetic field and embedded in the insulating walls of the duct. Such known machines are magnetohydrodynamic generators for producing direct or alternating current and magnetohydrodynamic jet-accelerators.

With the values normally encountered of magnetic field strength and of electrical conductivity of the ionized gas, the known Hall effect is, as a rule, very great, i.e., the electric current and electric field strength are not parallel, referred to the gas which is flowing. The directions of the electric current and electric field strength are at an acute angle, the so-called Hall angle $\tau$, whereof the value is given by the relationship $\tan \tau = \beta$, so that $\beta$ is the Hall-effect factor. With the known arrangement of two oppositely disposed electrodes, the direction of the electric field is fixed, and is perpendicular to the electrodes, i.e., perpendicular to the direction of the gas-flow and perpendicular to the magnetic field. The current must then flow at an inclination to the duct, which involves a large reduction in the power density of the machine.

A known measure for avoiding the reduction in power density resides in making the positive and negative electrodes not in a single continuous piece in each case, but in subdividing them into a plurality of mutually insulated segments in the direction in which the gas flows. When the machine is operated as a generator, each pair of oppositely disposed electrodes is connected to an individual external load, with the result that the current vector is bound to be perpendicular to the direction in which the gas flows. However, subdividing the electrodes makes it possible for there to be an electric field disposed in the longitudinal direction of the duct, so that the requirement of the Hall effect is complied with.

Complete compensation for the reduction in power density is attainable only if an infinitely large number of electrodes is arranged in pairs at infinitely small intervals along the duct. However, this cannot be done for practical reasons. With a finite number of electrodes arranged in pairs, however, the disadvantageous result of the Hall effect is supplemented by further undesired effects, because very high current densities usually occur at the edges of the electrodes.

High current densities at the edges of the electrodes are undesirable for various reasons. They accelerate local destruction of the electrode material, and cause a high voltage drop across the electrodes. Furthermore, high current concentrations via the insulator surfaces between two electrodes disposed side-by-side can encourage additional local ionization of the gas and thus produce electrical breakdowns between the electrodes, which impairs the effect of subdividing the electrodes into segments.

It is the object of this invention to reduce any high current density at the edges of the electrodes and avoid the detrimental effect of current concentration. According to the invention, this is attained by reason of the fact that the electrodes comprise ribs extending parallel to the direction in which the gas flows, and projecting into the gas-flow.

The invention will be more precisely explained with aid of the accompanying drawings, wherein:

FIGURE 1 diagrammatically shows a known magnetohydrodynamic generator with a plurality of electrodes arranged in pairs for producing direct current;

FIGURE 3 shows a longitudinal section through an example of embodiment of the ribs on an electrode, according to the present invention;

FIGURE 4 shows a transverse section on line 4—4 of FIG. 3 through the ribs on an electrode;

FIGURE 5 shows a plan view of the ribs on an electrode, and

FIGURE 6 shows another embodiment of the invention, this view being a longitudinal section similar to FIGURE 3.

Figure 1:
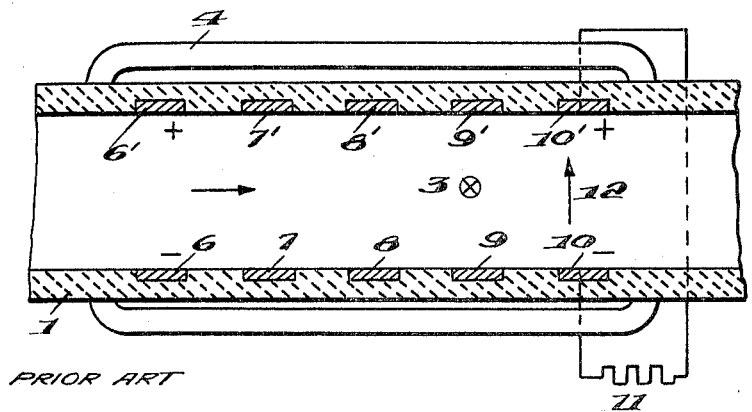

With reference now to FIGURE 1, the flow duct of a known magnetohydrodynamic generator for producing direct current is designated by 1. The ionized gas flows through the duct 1 in the direction designated by 2. The magnetic field 3 is set up perpendicularly to the direction 2 in which the gas flows and in a direction rearwards perpendicular to the plane of the drawing, the coils 4 serving for this purpose. A plurality of electrodes 6, 6'-7, 7'-8, 8'-9, 9' and 10, 10', embedded in the insulating walls 5, are arranged in pairs along the duct 1. The magnetic field 3 induces a voltage between the electrodes 6, 6', and for example the electrode 6' (positive electrode) is at a higher potential than the electrode 6 (negative electrode). If each pair of electrodes is connected to an external load, as is shown for the sake of greater clarity in the form of the loads 11 for the pair of electrodes 10, 10' only, and electric current flows in the direction 12, an electrical power is delivered to the load 11 by the generator. Because of the Hall effect, the downstream electrodes, for example, the electrodes 9, 10 or 9', 10', are at a higher potential than the upstream electrodes, for example the electrodes 6, 7 or 6', 7'. The individual pairs of electrodes must accordingly be insulated from one another, so that in known manner the Hall voltage is not short-circuited along the duct.

Figure 2:
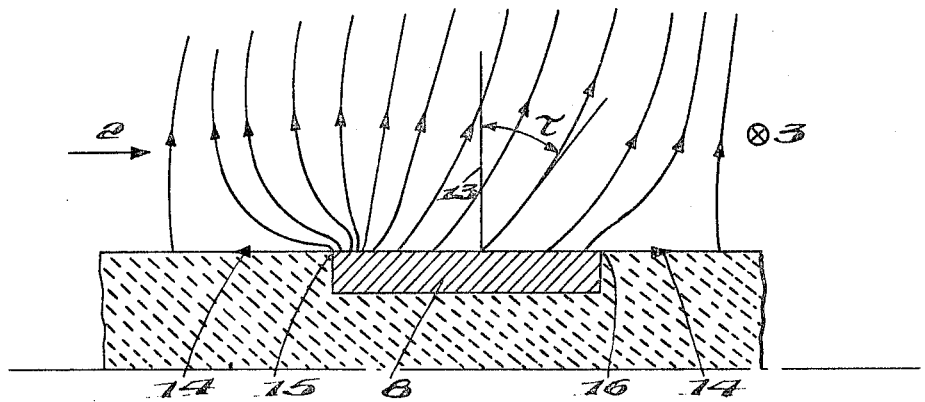
FIGURE 2 shows an illustration of the current distribution near an electrode.

In the known embodiment of a magnetohydrodynamic generator, oppositely disposed duct walls are therefore alternately covered with electrodes and insulators on their inside. FIGURE 2 shows the current distribution in the surroundings of a negative electrode in the vicinity of the wall, for example the electrode 8 in FIGURE 1. 2 again designates the direction in which the ionized gas flows, and 3 the direction of the magnetic field. Current flows from the surface of the electrode 8 facing the gas, and because of the Hall effect is inclined at the Hall angle $\tau$ to the perpendicular 13. $\tau$ increases with the magnitude of the Hall effect, and is always less than 90°. The quantity $\tan \tau = \beta$ is the Hall-effect factor. The normal component of the current density must disappear on the surface of the insulator 5, i.e. of the insulating wall. Thus, the current flows there parallel to the surface in the direction 14.

The current vector undergoes a sudden change in direction at the edges of the electrode 8. However, the change in direction of the current is always accompanied by a current concentration according to Maxwell's equations, and the current concentration becomes heavier as the change in direction of the current becomes greater. The change in direction amounts to $90° + \tau$ at the upstream edge 15 of the negative electrode 8, and $90° - \tau$ at the downstream edge 16. The edge 15 of the negative electrode is accordingly always exposed to a higher current concentration than the edge 16. The conditions are exactly the opposite at the positive electrode.

The present invention is based on the knowledge that the said large changes in direction of the current vector in the immediate vicinity of the edges of the electrode are to a large extent avoided if a suitably shaped part of the electrode projects into the gas-flow. Since such a design for the electrodes is precluded on technical grounds as regards flow, it has been found that it is surprisingly enough in order sufficiently to reduce the current concentration, if the electrodes comprise ribs extending parallel to the direction in which the gas flows, and projecting into the gas-flow.

FIGURE 3 shows a longitudinal section through an example of embodiment of a pair of ribbed electrodes. The negative electrode 8 and the positive electrode 8' are embedded in the insulating duct walls 5 between which the ionized gas flows in the direction 2, and between which the magnetic field 3 is set up. The electrodes 8 and 8' are provided with ribs 17 and 17' which project into the gas-flow.

The shape shown in FIGURE 3 for the ribs, which exhibit an inclination of about the angle $\tau$ to a perpendicular to wall 5 at the upstream edges 18 and 18' and at the downstream edges 19 and 19', tan $\tau$ being equal to the Hall-effect factor $\beta$, is particularly advantageous because this measure prevents the current vector in the gas from undergoing any change in direction whatever when the gas passes round a corner from the insulator surface to the edge of the rib. As may be seen from FIGURE 2, and as is illustrated in FIGURE 3, the edge 18 of the negative electrode 8 must be at an acute angle of $90°-\tau$ to the duct wall 5, and the edge 19 at an obtuse angle of $90°+\tau$ thereto. The conditions are reversed for the positive electrode 8' in the case of which the edge 18' is at an obtuse angle of $90°+\tau$ to the duct wall 5, and the edge 19' is at an acute angle of $90°-\tau$ thereto.

FIGURE 4 shows a transverse section along line 4—4 of FIG. 3 through the electrode 8 comprising the ribs 17. As may be seen, the roots 23 of the ribs 17 are rounded off in order to avoid any current concentration at this point.

FIGURE 5 shows a plan view of the electrode 8 comprising the ribs 17, and 2 signifies the direction in which the ionized gas flows. In order to keep the flow resistance small, the upstream edges 18 and the downstream edges 19 of the ribs 17 are designed in accordance with known aerodynamic principles.

It is not necessary for the edges of the ribs to be inclined at least substantially at the angle $\tau$ (tan $\tau=\beta$) with respect to the perpendicular to the duct wall, as shown in FIGURE 3. In order to attain a considerable reduction in any troublesome current concentration, it is sufficient for the angle of inclination to be between $\tau$ and 0°. In particular, it is expedient for aerodynamic reasons to impart such a shape to those edges which are at an acute angle to the duct wall in FIGURE 3 that they are perpendicular to the wall. This further form of embodiment of the ribs is illustrated in FIGURE 6. It may be seen from this figure that the upstream edge 21 of the negative electrode 8 is at an angle of 0° to the perpendicular to the wall 5, i.e., is perpendicular to the latter, while the downstream edge 22 is furthermore at an angle $\tau$ to the perpendicular to the wall 5. The edges of the positive electrode 8' are reversed, the upstream edge 21' being at an angle of $\tau$ to the perpendicular to the wall 5, while the downstream edge 22' is perpendicular to the wall 5. A further design for the ribs resides in that the ribs on the electrodes are mutually offset in the direction in which the gas flows. This measure results in a further reduction in the current concentration.

The invention has been explained with reference to the examples of embodiment shown in the figures, and in respect of a magnetohydrodynamic generator for producing direct current. However, the invention is not limited to this use, but may be used in equally advantageous manner for example in the case of an alternating-current generator provided with electrodes. In this case, it is expedient, because of the alternating polarity of the voltage produced, to make the edges of all the ribs on the electrodes perpendicular to the walls. A further possible use of ribbed electrodes is in conjunction with jet-accelerators of the magnetohydrodynamic type.

I claim:

1. A magnetohydrodynamic machine comprising a duct of electrical insulating material through which a hot ionized gas is passed in a longitudinal direction, means for producing a magnetic field extending across said duct and perpendicularly to the direction of gas flow through said duct, and a plurality of electrodes located within said duct and arranged parallel to said magnetic field and embedded in the duct walls, said electrodes being grouped electrically in pairs spaced longitudinally along the duct with each pair consisting of positive and negative electrodes located respectively in opposite walls of said duct, and said electrodes being provided with ribs extending parallel to the direction of gas flow and projecting into the path of gas flow.

2. A magnetohydrodynamic machine as defined in claim 1 wherein the edges of said ribs on said electrodes are inclined with respect to a perpendicular to the duct walls at an angle of between 0° and $\tau$ (tan $\tau=\beta=$Hall-effect factor), the upstream edge of each negative electrode being at an acute angle to the duct wall and the downstream edge at an obtuse angle thereto, and the upstream edge of each positive electrode being at an obtuse angle to the duct wall and the downstream edge at an acute angle thereto.

3. A magnetohydrodynamic machine as defined in claim 2 wherein the upstream edge of each negative electrode and the downstream edge of each positive electrode are at least substantially perpendicular to the duct wall, and wherein the downstream edge of each negative electrode and the upstream edge of each positive electrode are inclined at at least an angle substantially equal to $\tau$ with respect to a perpendicular to the duct walls.

4. A magnetohydrodynamic machine as defined in claim 1 wherein said ribs on said electrodes are mutually offset in the direction of gas flow through said duct.

5. A magnetohydrodynamic machine as defined in claim 1 wherein an alternating voltage is produced between the electrodes of each pair and wherein the edges of the ribs on said electrodes are perpendicular to the duct walls.

6. A magnetohydrodynamic machine as defined in claim 1 wherein the upstream and downstream edges of said ribs on said electrodes have a streamline configuration.

7. A magnetohydrodynamic machine as defined in claim 1 wherein the root portions of said ribs on said electrodes are rounded off.

8. A magnetohydrodynamic machine as defined in claim 1 wherein the tip portions of said ribs on said electrodes are rounded off.

9. A magnetohydrodynamic machine as defined in claim 1 wherein the upstream and downstream edges on said ribs on said electrodes have a streamline configuration, and wherein the tip and root portions are rounded off.

No references cited.

J D MILLER, *Primary Examiner.*

D. X. SLINEY, *Assistant Examiner.*